US012597090B2

(12) United States Patent
Wu

(10) Patent No.: US 12,597,090 B2
(45) Date of Patent: Apr. 7, 2026

(54) IMAGE DITHERING APPARATUS AND METHOD HAVING A RANDOM DITHERING MECHANISM

(71) Applicant: REALTEK SEMICONDUCTOR CORPORATION, Hsinchu (TW)

(72) Inventor: Li-Yong Wu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 217 days.

(21) Appl. No.: 18/398,229

(22) Filed: Dec. 28, 2023

(65) Prior Publication Data

US 2024/0233081 A1 Jul. 11, 2024

(30) Foreign Application Priority Data

Jan. 6, 2023 (CN) .......................... 202310018762.3

(51) Int. Cl.
*G06T 5/00* (2024.01)
(52) U.S. Cl.
CPC ...... *G06T 5/00* (2013.01); *G06T 2207/10024* (2013.01); *G06T 2207/20021* (2013.01)
(58) Field of Classification Search
CPC ............. G06T 5/00; G06T 2207/10024; G06T 2207/20021; G09G 3/2044; G09G 3/2055; H04N 9/64; H04N 9/67; H04N 1/644

(Continued)

(56) References Cited

U.S. PATENT DOCUMENTS 5,640,249 A * 6/1997 Rao .................... H04N 1/40087
358/3.1
2005/0280871 A1* 12/2005 Gardella ................ H04N 19/00
375/E7.207

(Continued)

FOREIGN PATENT DOCUMENTS

TW 459181 B 10/2001

OTHER PUBLICATIONS

Liu Chao-Wen, Bits converter using magic matrix frame rate control, Oct. 11, 2001, CTX Opto Electronics Corp, TW459181 (B), pp. 2-7, Figs. 1-4, English.*

(Continued)

*Primary Examiner* — Prabodh M Dharia
(74) *Attorney, Agent, or Firm* — WPAT, PC

(57) ABSTRACT

An image dithering method having a random dithering mechanism is disclosed. Each of pixel blocks of an input image is set to be an under-calculation block to perform steps outlined below. (A) A selected parameter look-up table is retrieved from parameter look-up tables. (B) A space reference parameter is generated according to a space parameter of the under-calculation block and/or a time reference parameter is generated according to a time parameter in an image stream. (C) A matrix number is looked up from the selected parameter look-up table according to the space reference parameter and/or the time reference parameter. (D) A selected dithering matrix is retrieved from according to the matrix number. (E) The selected dithering matrix and the under-calculation block are superimposed to generate a dithered block. Dithered blocks corresponding to the pixel blocks generated according to steps (A)-(E) are outputted as a dithered image.

20 Claims, 6 Drawing Sheets

(58) Field of Classification Search
USPC ............. 345/597, 605, 596; 375/240, 7.207;
358/3.1
See application file for complete search history.

(56) References Cited

U.S. PATENT DOCUMENTS

| | | | |
|---|---|---|---|
| 2007/0053429 A1* | 3/2007 | Jawerth | H04N 19/132 |
| | | | 375/240 |
| 2013/0002703 A1* | 1/2013 | Tripathi | G09G 3/2051 |
| | | | 345/596 |
| 2013/0235072 A1* | 9/2013 | Longhurst | H04N 1/644 |
| | | | 345/605 |
| 2020/0177767 A1* | 6/2020 | Kelly | H04N 9/64 |
| 2023/0316980 A1* | 10/2023 | Jang | G09G 3/2044 |

OTHER PUBLICATIONS

Liu Chao-Wen, Bits converter using magic matrix frame rate control, Oct. 11, 2001, CTX Opto Electronics Corp, TW459181 (B), pp. 2-7, Figs. 1-4, Taiwanese.*

OA letter of a counterpart TW application (appl. No. 112105635) mailed on Apr. 29, 2024. Summary of the TW OA letter: 1. Claims 1 and 8-10 are rejected as being anticipated by cited reference 1 (TW459181B). 2. Claims 2-7 are allowable. Correspondence bewteen claims of TW counterpart application and claims of US application: 1. Claims 1, 2-3, . . . , and 10 in TW counterpart application correspond to claims 1, 2-3, . . . , 9 and 11 in US Application, respectively.

* cited by examiner

200

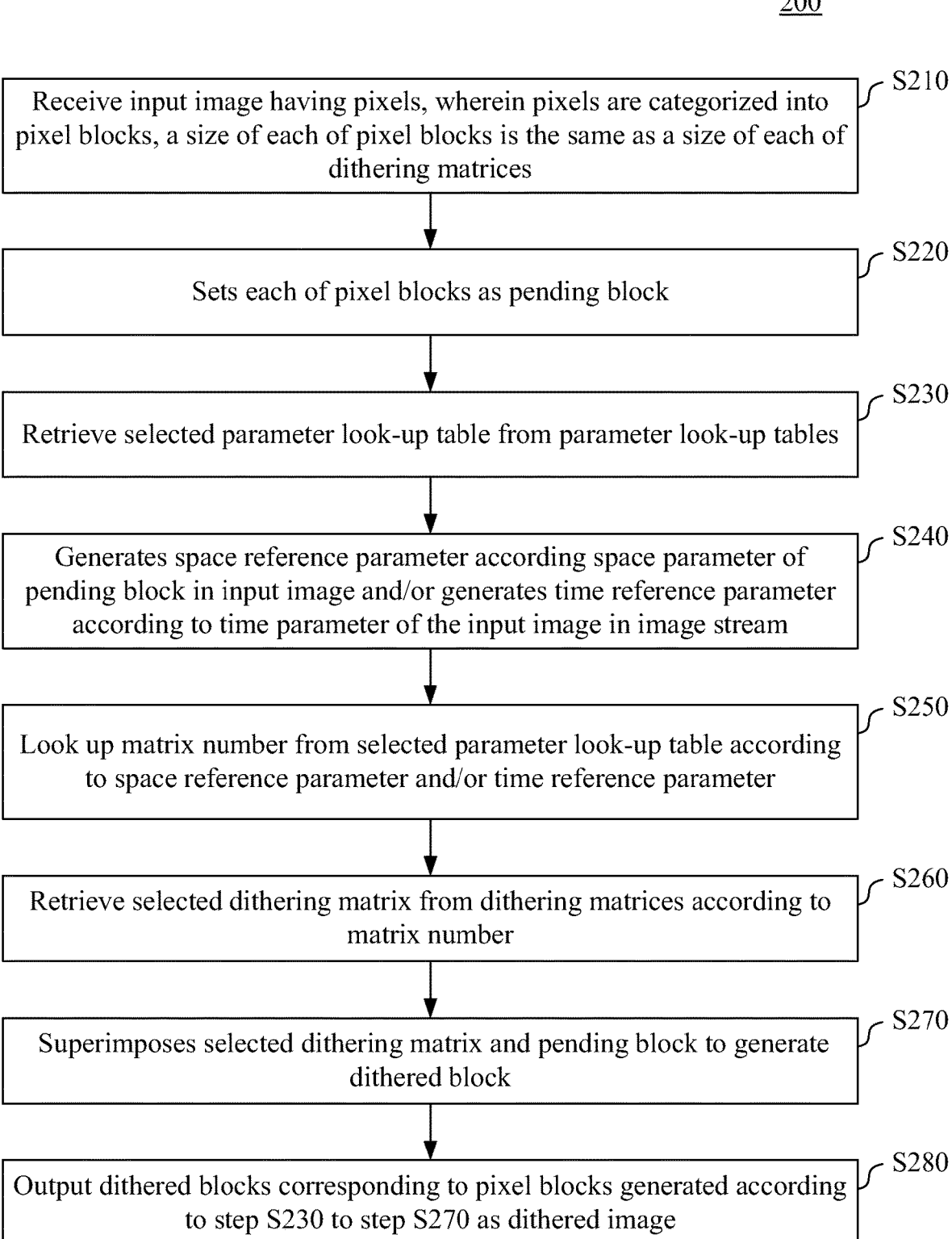

Receive input image having pixels, wherein pixels are categorized into pixel blocks, a size of each of pixel blocks is the same as a size of each of dithering matrices — S210

Sets each of pixel blocks as pending block — S220

Retrieve selected parameter look-up table from parameter look-up tables — S230

Generates space reference parameter according space parameter of pending block in input image and/or generates time reference parameter according to time parameter of the input image in image stream — S240

Look up matrix number from selected parameter look-up table according to space reference parameter and/or time reference parameter — S250

Retrieve selected dithering matrix from dithering matrices according to matrix number — S260

Superimposes selected dithering matrix and pending block to generate dithered block — S270

Output dithered blocks corresponding to pixel blocks generated according to step S230 to step S270 as dithered image — S280

Fig. 2

| LSB pixel value | Table ID |
|:---:|:---:|
| 0 | 3 |
| 1 | 2 |
| 2 | 0 |
| 3 | 3 |
| 4 | 3 |
| 5 | 1 |
| ⋮ | ⋮ |
| 60 | 0 |
| 61 | 3 |
| 62 | 1 |
| 63 | 1 |

AT

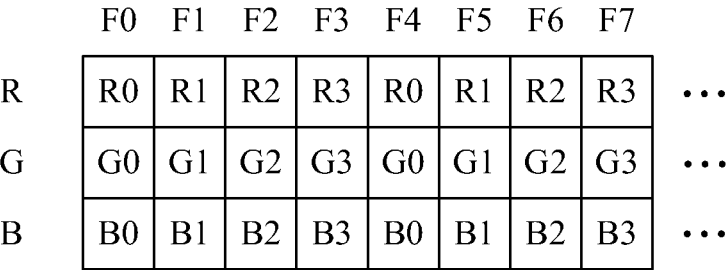
Fig. 8A
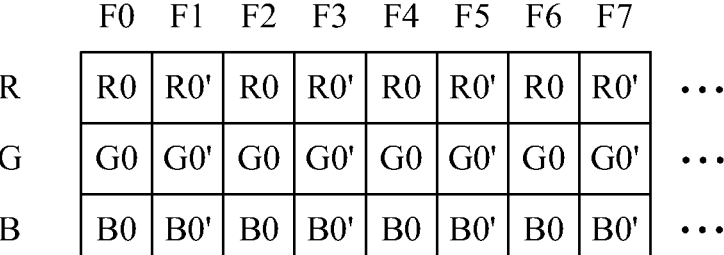
Fig. 8B
| | F0 | F1 | F2 | F3 | F4 | F5 | F6 | F7 | |
|---|---|---|---|---|---|---|---|---|---|
| R | R0 | R0' | R0 | R0' | R0 | R0' | R0 | R0' | ... |
| G | G0 | G0' | G0 | G0' | G0 | G0' | G0 | G0' | ... |
| B | B0 | B0' | B0 | B0' | B0 | B0' | B0 | B0' | ... |
Fig. 8C

IMAGE DITHERING APPARATUS AND METHOD HAVING A RANDOM DITHERING MECHANISM

BACKGROUND OF THE INVENTION

1. Field of the Invention

The present disclosure relates to an image dithering apparatus and an image dithering method having a random dithering mechanism.

2. Description of Related Art

An image frame includes a plurality of pixels each stored digitally by a plurality of bits. When a greater number of bits are used for the pixels, a richer range of colors can be displayed.

An upper limit of the number of bits of each of the pixels in the image that the image processing circuit is able to process is presented due to the hardware processing ability. When the number of bits of each of the pixels in the image provided by the image transmission terminal is higher than the upper limit of the number of bits of each of the pixels in the image that the image receiving terminal is able to process, the image receiving terminal removes a plurality of least significant bits. Though the image transmission terminal may use a dithering method to avoid the color distortion generated due to the removing of the least significant bits at the image receiving terminal, plaques of pixels or patterns of pixels may occur in the dithered image when the dithering method is predictable. A worse display result may be presented.

SUMMARY OF THE INVENTION

In consideration of the problem of the prior art, an object of the present disclosure is to provide an image dithering apparatus and an image dithering method having a random dithering mechanism.

The present invention discloses an image dithering method having a random dithering mechanism that includes steps outlined below. An input image having a plurality of pixels is retrieved, wherein the plurality of pixels are categorized into a plurality of pixel blocks each having a size that is the same as a size of each of a plurality of dithering matrices. Each of the plurality of pixel blocks is set as a pending block to perform steps outlined below. (A) A selected parameter look-up table is retrieved from a plurality of parameter look-up table. (B) A space reference parameter of the under-calculation block in the input image is generated and/or a time reference parameter is generated according to a time parameter of the input image in an image stream. A matrix number is looked up from the selected parameter look-up table according to the space reference parameter and/or the time reference parameter. (D) A selected dithering matrix is retrieved from the plurality of dithering matrices according to the matrix number. (E) The selected dithering matrix and the pending block are superimposed to generate a dithered block. A plurality of dithered blocks corresponding to the pixel blocks generated according to steps (A)-(E) are outputted as a dithered image.

The present invention also discloses an image dithering apparatus having a random dithering mechanism that includes a storage circuit and a processing circuit. The storage circuit is configured to store a plurality of parameter look-up tables and a plurality of dithering matrices. The processing circuit is electrically coupled to the storage circuit to access the storage circuit, and configured to execute an image dithering method that includes steps outlined below. An input image having a plurality of pixels is received, wherein the plurality of pixels are categorized into a plurality of pixel blocks each having a size that is the same as a size of each of the plurality of dithering matrices. Each of the plurality of pixel blocks is set as a pending block to perform steps outlined below. (A) A selected parameter look-up table is retrieved from the plurality of parameter look-up table. (B) A space reference parameter of the under-calculation block in the input image is generated and/or a time reference parameter is generated according to a time parameter of the input image in an image stream. A matrix number is looked up from the selected parameter look-up table according to the space reference parameter and/or the time reference parameter. (D) A selected dithering matrix is retrieved from the plurality of dithering matrices according to the matrix number. (E) The selected dithering matrix and the pending block are superimposed to generate a dithered block. A plurality of dithered blocks corresponding to the pixel blocks generated according to steps (A)-(E) are outputted as a dithered image.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 2 illustrates a flow chart of an image dithering method having a random dithering mechanism according to an embodiment of the present invention.

FIG. 8A, FIG. 8B and FIG. 8C illustrate diagrams of the corresponding relation between different color channels and the corresponding parameter look-up tables on the time axis according to an embodiment of the present invention.

DETAILED DESCRIPTION OF THE PREFERRED EMBODIMENTS

An aspect of the present invention is to provide an image dithering apparatus and an image dithering method having a random dithering mechanism to retrieve (e.g., by selecting or determining) dithering matrices from a plurality of parameter look-up tables in a random manner according to space information and/or time information of a pending (for processing) block of an image to perform dithering on the pending block such that the dithered image has a better dithering result.

Figure 1:
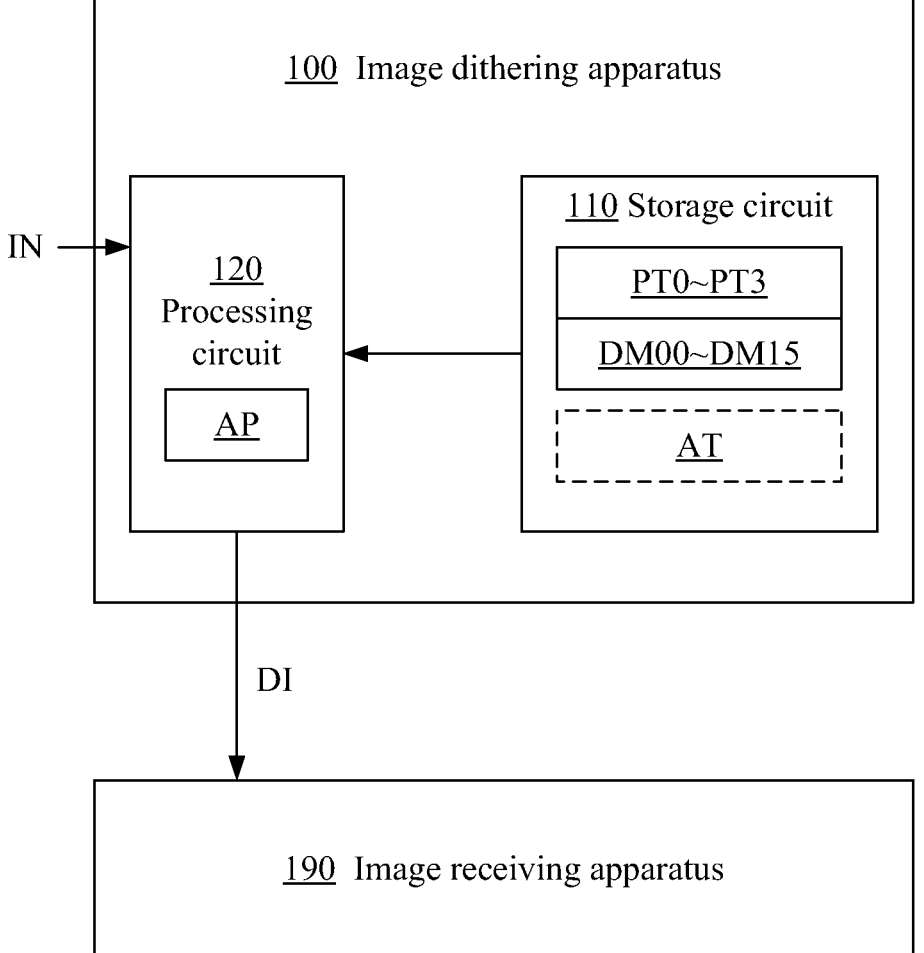
FIG. 1 illustrates a block diagram of an image dithering apparatus having a random dithering mechanism and an image receiving apparatus that the image dithering apparatus is coupled to according to an embodiment of the present invention.

Reference is now made to FIG. 1. FIG. 1 illustrates a block diagram of an image dithering apparatus 100 having a random dithering mechanism and an image receiving apparatus 190 that the image dithering apparatus 100 is coupled to according to an embodiment of the present invention.

Functionally, the image dithering apparatus 100 is configured to perform dithering on an input image IN to generate a dithered image DI, wherein each of a plurality of pixels of each of the dithered image DI and the input image IN has the same number of bits. The image dithering apparatus 100 transmits the dithered image DI to such as, but not limited to the image receiving apparatus 190. The image receiving apparatus 190 is such as, but not limited to an image playback apparatus or other apparatuses that can perform image processing.

In an embodiment, a number of bits of each of the pixels of the image that the image receiving apparatus 190 can process is lower than a number of bits of each of the pixels of the input image IN. As a result, N least significant bits (LSB) of each of the pixels in the input image IN have to be removed, wherein N is an integer larger than 1 and is preferably an integer number of a multiple of 2. For example, the number of bits of each of the pixels included in the input image IN can be 24 bits. The number of bits of each of the pixels included in the image that the image receiving apparatus 190 can process is 18 bits. As a result, 6 least significant bits (N=6) has to be removed by the image receiving apparatus 190.

In order to avoid image distortion generated by the removing of the N least significant bits of each of the pixels in the input image IN, the image dithering apparatus 100 may generate the dithered image DI based on the dithering mechanism so as to be received and processed by the image receiving apparatus 190 to decrease a degree of the image distortion.

Structurally, the image dithering apparatus 100 may include a storage circuit 110 and a processing circuit 120. However, the present invention is not limited thereto.

The storage circuit 110 can be any storage apparatus configured to store data, such as but not limited to a random access memory (RAM), a read only memory (ROM) or a hard disk. It is appreciated that in different embodiments, the storage circuit 110 may include one or more than one of the storage apparatuses to store different types of data.

The storage circuit 110 is configured to store a plurality of parameter look-up tables PT0~PT3 and a plurality of dithering matrices DM00~DM15. In an embodiment, the parameter look-up tables PT0~PT3 are identified by corresponding table identification numbers 0~3, and the dithering matrices DM00~DM15 are identified by corresponding matrix numbers 0~15. The configuration and the content of the parameter look-up tables PT0~PT3 and the dithering matrices DM00~DM15 are described in detail in the later paragraphs.

The processing circuit 120 is electrically coupled to the storage circuit 110. The processing circuit 120 is configured to execute an application program AP to access the storage circuit 110 and operate accordingly, so as to execute an image dithering method having a random dithering mechanism to implement the function of the image dithering apparatus 100.

The operation of the image dithering apparatus 100 is described in detail in accompany with FIG. 2 in the following paragraphs. FIG. 2 illustrates a flow chart of an image dithering method 200 having a random dithering mechanism according to an embodiment of the present invention.

In step S210, the processing circuit 120 receives the input image IN having a plurality of pixels, wherein the pixels are categorized into a plurality of pixel blocks, a size of each of the pixel blocks is the same as a size of each a plurality of dithering matrices.

Figure 3:
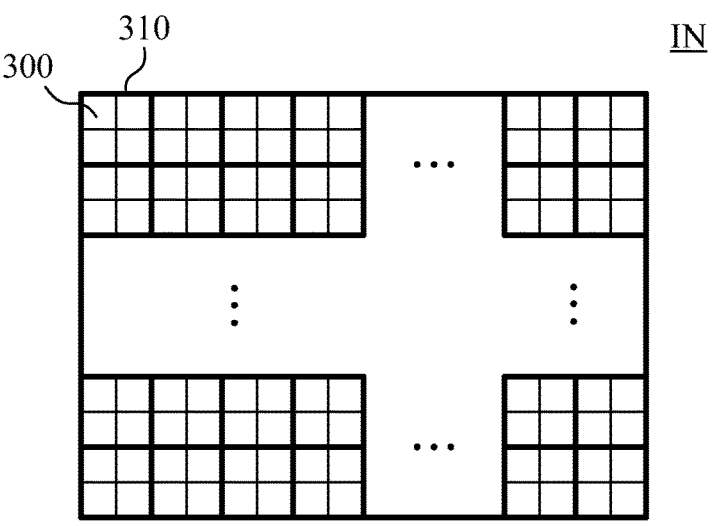
FIG. 3 illustrates a diagram of the input image according to an embodiment of the present invention.

Reference is now made to FIG. 3. FIG. 3 illustrates a diagram of the input image IN according to an embodiment of the present invention.

The input image IN includes a plurality of pixels each having a size of 1×1, e.g., the pixel 300 labeled in FIG. 3. The pixels in the input image IN are categorized into a plurality of pixel blocks. Each of the pixel blocks in FIG. 3 is illustrated as being surrounded by a thick line frame, e.g., the pixel block 310 labeled in FIG. 3.

In order to perform corresponding operation(s) on the pixel blocks and the dithering matrices DM00~DM15, the size of each of the pixel blocks and the size of each of the dithering matrices DM00~DM15 are the same. In the present embodiment, each of the pixel blocks includes four pixels and has a size of 2×2.

In step S220, the processing circuit 120 sets each of the pixel blocks as a pending (to be processed) block to perform step S230 to step S270.

In step S230, the processing circuit 120 retrieves a selected parameter look-up table from the parameter look-up tables PT0~PT3. The detailed retrieving method is described in later paragraphs in accompany with the embodiment illustrated in FIG. 5.

In step S240, the processing circuit 120 generates (e.g., calculates) a space reference parameter according to a space parameter of the pending block in the input image IN and/or generates (e.g., calculates) a time reference parameter according to a time parameter of the input image IN in an image stream.

In an embodiment, the space parameter corresponds to a location of the pending block in the input image IN. For example, the space parameter is represented by an X-axis coordinate and a Y-axis coordinate of the pending block in the input image IN. Take the pixel block 310 labeled in FIG. 3 as an example, the coordinate relative to other pixel blocks in the input image IN is (0, 0). The processing circuit 120 generates the space reference parameter by applying the coordinate to a predetermined formula.

In an embodiment, the input image IN is one of a plurality of image frames in an image stream and the time parameter is a frame identification number of the input image IN within these image frames. The processing circuit 120 may apply the frame identification number to a predetermined formula to perform calculation accordingly to generate the time reference parameter.

It is appreciated that, the formulas related to space and time can be configured according to practical requirements. The present invention is not limited to certain formulas.

In step S250, the processing circuit 120 looks up a matrix number from the selected parameter look-up table according to the space reference parameter and/or the time reference parameter.

In step S260, the processing circuit 120 retrieves a selected dithering matrix from the dithering matrices DM00~DM15 according to the matrix number.

In an embodiment, each of the parameter look-up tables PT0~PT3 actually includes a space parameter look-up table and/or a time parameter look-up table (not illustrated). After retrieving the selected parameter look-up table (such as, but not limited to the parameter look-up table PT2), the processing circuit 120 looks up a first parameter from the space parameter look-up table of the selected parameter look-up table according to the space reference parameter, and/or look ups a second parameter from the time parameter look-up table of the selected parameter look-up table according to the time reference parameter.

Further, according to an amount of the dithering matrices, the processing circuit 120 performs calculation on the first parameter and/or the second parameter to generate the matrix number and retrieves the selected dithering matrix (such as, but not limited to the dithering matrix DM07) from the dithering matrices DM00~DM15 according to the matrix number.

The performing of step S250 and step S260 are described in detail by using the following three embodiments as examples.

In the first embodiment, when each of the parameter look-up tables PT0~PT3 includes a space parameter look-up table and a time parameter look-up table, the processing circuit 120 looks up the tables according to both the space reference parameter and the time reference parameter to generate the first parameter and the second parameter.

The processing circuit 120 calculates a sum of the first parameter and the second parameter, performs a modulo operation on the sum of the first parameter and the second parameter according to the amount of the dithering matrices to obtain a remainder, and generates the matrix number according to the remainder.

In a numerical example, when the amount of the dithering matrices DM00~DM15 is 16 and the sum of the first parameter and the second parameter is 23, the processing circuit 120 performs the modulo operation on 23 according to 16 to obtain the remainder of 7. The processing circuit 120 further sets the remainder, which is 7, as the matrix number, to retrieve the dithering matrix DM07 as the selected dithering matrix.

In the second embodiment, when each of the parameter look-up tables PT0~PT3 only includes the space parameter look-up table, or when the processing circuit 120 only allows the space parameter look-up table to be looked up under the condition that each of the parameter look-up tables PT0~PT3 includes the space parameter look-up table and the time parameter look-up table, the processing circuit 120 looks up the first parameter from the space parameter look-up table according to the space reference parameter. The processing circuit 120 further performs the modulo operation on the amount of the dithering matrices according to the first parameter to obtain the remainder, and generates the matrix number according to the remainder.

In the third embodiment, when each of the parameter look-up tables PT0~PT3 only includes the time parameter look-up table, or when the processing circuit 120 only allows the time parameter look-up table to be looked up under the condition that each of the parameter look-up tables PT0~PT3 includes the space parameter look-up table and the time parameter look-up table, the processing circuit 120 looks up the second parameter from the time parameter look-up table according to the time reference parameter. The processing circuit 120 further performs the modulo operation on the amount of the dithering matrices according to the second parameter to obtain the remainder, and generates the matrix number according to the remainder.

In step S270, the processing circuit 120 superimposes the selected dithering matrix and the pending block to generate a dithered block.

Figure 4:
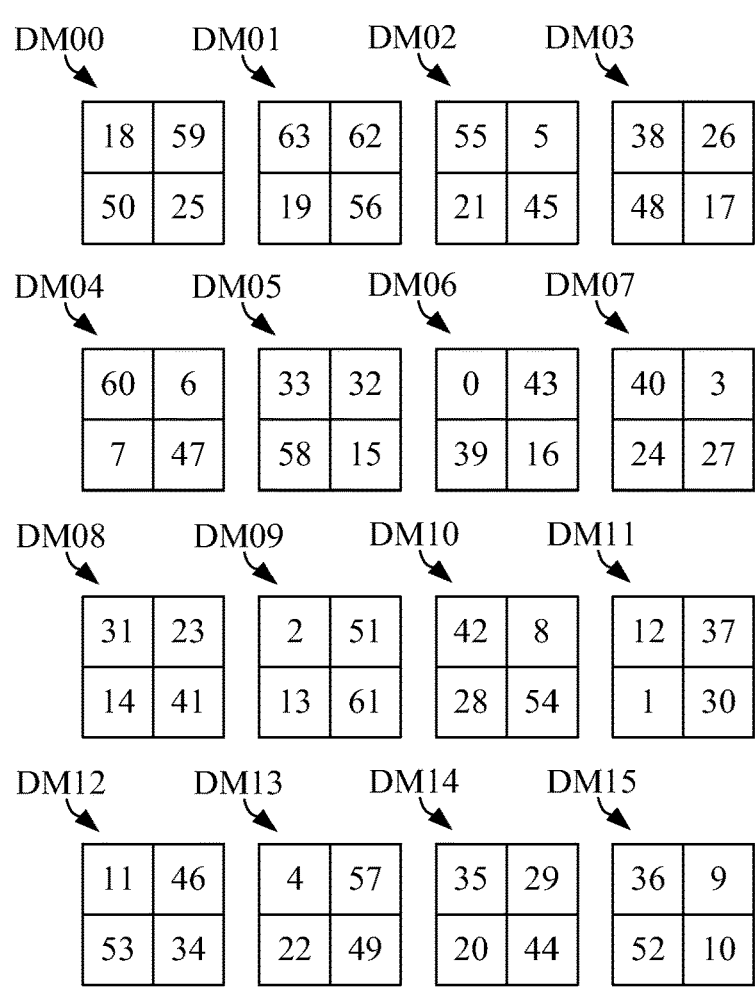
FIG. 4 illustrates a diagram of the dithering matrices according to an embodiment of the present invention.

Reference is now made to FIG. 4. FIG. 4 illustrates a diagram of the dithering matrices DM00~DM15 according to an embodiment of the present invention.

In an embodiment, when the number of bits of the least significant bits to be removed in the input image IN is N, each of a plurality of matrix entry values included in the dithering matrices corresponds to one of values from 0 to $2^N-1$. When N is 6, the matrix entry values of the 16 dithering matrices DM00~DM15, each having a size of 2×2, correspond to 0~63. Take the dithering matrix DM07 as an example, the matrix entry values thereof include 40, 3, 24 and 27.

As a result, when the selected dithering matrix is the dithering matrix DM07 and the pending block is the pixel block 310 in FIG. 3, since the sizes thereof are the same, the processing circuit 120 superimposes the matrix entry values of the dithering matrix DM07 and the pixel values of the pixel blocks 310 to generate the dithered block.

In step S280, the processing circuit 120 outputs the dithered blocks corresponding to the pixel blocks generated according to step S230 to step S270 as the dithered image DI.

More specifically, after setting each of all the pixel blocks as the pending block and processing these blocks by using the flow from steps S230 to step S270, a plurality of dithered blocks are generated by the processing circuit 120.

The processing circuit 120 further outputs these dithered blocks as the dithered image DI and transmits the dithered image DI through such as, but not limited to a communication circuit (not illustrated) included by the image dithering apparatus 100 to the image receiving apparatus 190 to be processed thereby.

It is appreciated that the above embodiments are described by using the condition that each of the pixels in the input image IN only includes one channel as an example. Actually, each of the pixels in the input image IN may include a plurality of color channels, such as but not limited to three color channels corresponding to a red color, a green color and a blue color.

The storage circuit 110 may store the parameter look-up tables corresponding to different color channels. For example, corresponding to each of the color channels, the storage circuit 110 may store four parameter look-up tables. The processing circuit 120 may retrieve different parameter look-up tables corresponding to different color channels to further retrieve the dithering matrices such that the pixels included in the pending block in the different color channels are superimposed with the corresponding dithering matrices to generate the dithered block that include the superimposed results corresponding to different color channels.

In different embodiments, the processing circuit 120 may select one of the parameter look-up tables PT0~PT3 in step S230 described above based on a different selection mechanism to retrieve the selected parameter look-up table.

In an embodiment, the processing circuit 120 retrieves the selected parameter look-up table according to the least significant bits included by each of the pixels in the pending block. A numerical example is used to describe the process in the following paragraphs.

Figure 5:
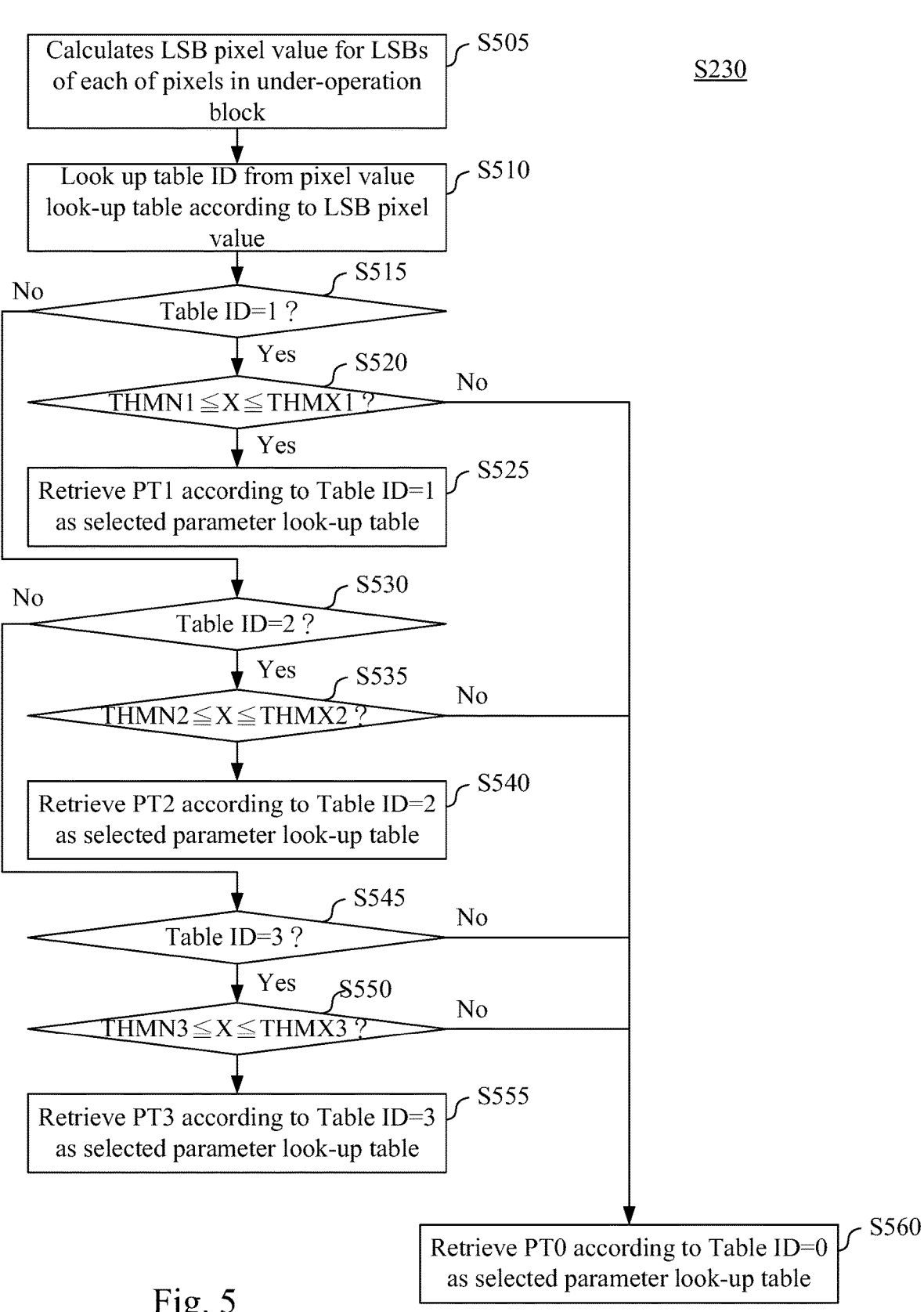
FIG. 5 illustrates a detailed flow chart of step S230 in FIG. 2 according to an embodiment of the present invention.

Reference is now made to FIG. 5. FIG. 5 illustrates a detailed flow chart of step S230 in FIG. 2 according to an embodiment of the present invention.

In step S505, the processing circuit 120 calculates a least significant bit pixel value for the least significant bits of each of the pixels in the pending block.

When the amount of the least significant bits is 6, the processing circuit 120 may perform calculation on the 6 least significant bits by such as, but not limited to performing an averaging thereon, obtaining a median therefrom or using other methods (e.g., using a specific function), to generate the least significant bit pixel value of the pending block. Since the range of the pixel values of the 6 least significant bits is 0~63 (64 values), the range of the least significant bit pixel value is also 0~63.

In step S510, the processing circuit 120 looks up a table identification number (abbreviated as table ID in FIG. 5) from a pixel value look-up table according to the least significant bit pixel value.

The processing circuit 120 retrieves the parameter look-up tables PT0~PT3 according to the amount of the least significant bit pixel value. For example, the storage circuit 110 may store a pixel value look-up table AT such that the processing circuit 120 looks up the table identification number from the pixel value look-up table AT according to the least significant bit pixel value, so as to retrieve the selected parameter look-up table according to the table identification number.

Figures 6, 7:
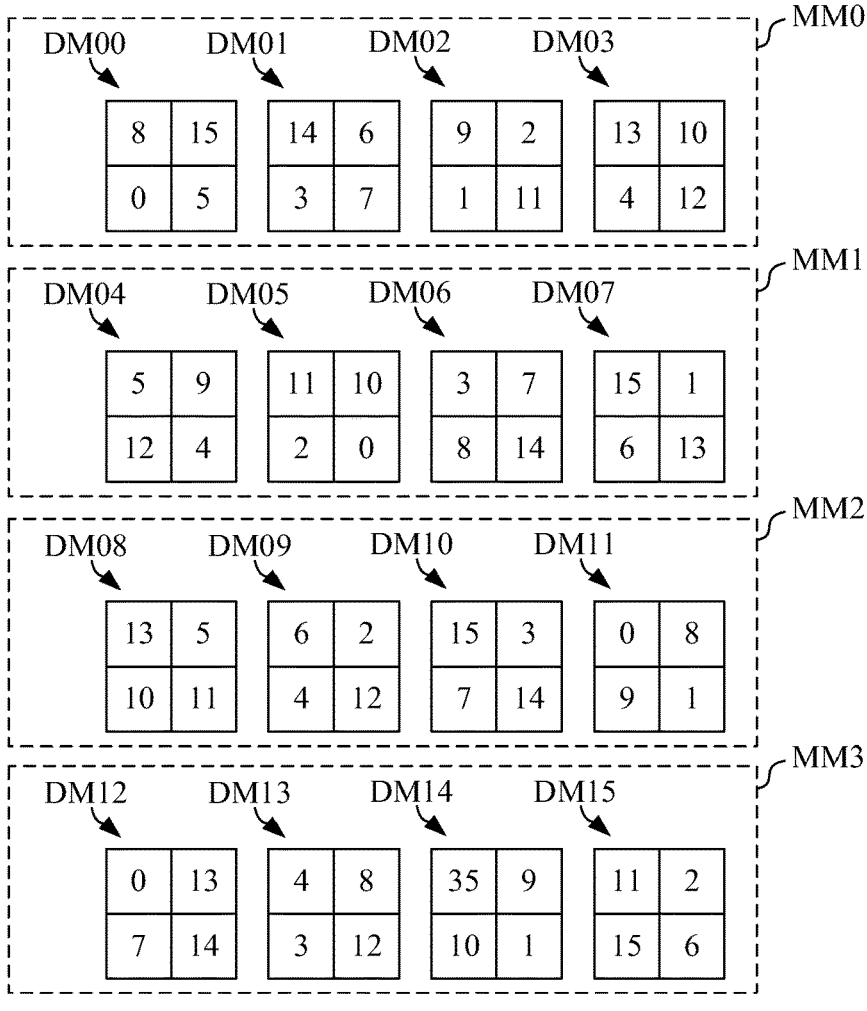
FIG. 6 illustrates a diagram of the pixel value look-up table according to an embodiment of the present invention.
FIG. 7 illustrates a diagram of the dithering matrices according to an embodiment of the present invention.

Reference is now made to FIG. 6. FIG. 6 illustrates a diagram of the pixel value look-up table AT according to an embodiment of the present invention.

The pixel value look-up table AT stores a corresponding relation between 64 values of the least significant bit pixel value ranging from 0~63 and the values of the table identification number. For example, the parameter look-up tables PT0~PT3 are identified by the corresponding values 0~3 of the table identification number. In the pixel value look-up table AT, each of the 64 values corresponds to one of the values of 0~3. In different embodiments, the corresponding relation of the 64 values and the three values 0~3 of the table identification number may be different depending on practical requirements. The present invention is not limited to the corresponding relation illustrated in FIG. 6.

After generating the least significant bit pixel value, the processing circuit 120 looks up the table identification number accordingly. Take the pixel value look-up table AT in FIG. 6 as an example, when the least significant bit pixel value generated by the processing circuit 120 is 62, the table identification number having the value 1 can be looked up according to the pixel value look-up table AT.

In step S515, the processing circuit 120 determines whether the value of the table identification number that is looked up is 1. In step S520, when the value of the table identification number that is looked up is determined to be 1, the processing circuit 120 determines whether a pixel value (represented by X in FIG. 5) in the pending block is within a value range THMN1~THMX1 that the value of the table identification number (which is 1) corresponds to.

In step S525, when the pixel value is within the value range THMN1~THMX1, the processing circuit 120 retrieves the parameter look-up table PT1 from the parameter look-up tables PT0~PT3 according to the table identification number having the value of 1 as the selected parameter look-up table.

In step S530, when the value of the table identification number that is looked up is determined to be not 1, the processing circuit 120 further determines whether the value of the table identification number that is looked up is 2. In step S535, when the value of the table identification number that is looked up is determined to be 2, the processing circuit 120 further determines whether the pixel value is within a value range THMN2~THMX2 that the value of the table identification number (which is 2) corresponds to.

In step S540, when the pixel value is within the value range THMN2~THMX2, the processing circuit 120 retrieves the parameter look-up table PT2 from the parameter look-up tables PT0~PT3 according to the table identification number having the value of 2 as the selected parameter look-up table.

In step S545, when the value of the table identification number that is looked up is determined to be not 2, the processing circuit 120 further determines whether the value of the table identification number that is looked up is 3. In step S550, when the value of the table identification number that is looked up is determined to be 3, the processing circuit 120 further determines whether the pixel value is within a value range THMN3~THMX3 that the value of the table identification number (which is 3) corresponds to.

In step S555, when the pixel value is within the value range THMN3~THMX3, the processing circuit 120 retrieves the parameter look-up table PT3 from the parameter look-up tables PT0~PT3 according to the table identification number having the value of 3 as the selected parameter look-up table.

In step S560, when the value of the table identification number that is looked up is determined to be not 3, or when the pixel value is determined to be not within the respective value range that the value of the table identification number corresponds to in step S520, S535 or S550, the processing circuit 120 retrieves the parameter look-up table PT0 from the parameter look-up tables PT0~PT3 accordingly as selected parameter look-up table.

As a result, in the embodiment in FIG. 5, besides looking up the pixel value look-up table AT, the processing circuit 120 also determines the parameter look-up table to be retrieved according to the value range that the pixel value is within.

More specifically, the processing circuit 120 determines whether the pixel value of the pixels in the pending block is within the value range that the table identification number corresponds to. When the pixel value is within the value range that the looked up table identification number corresponds to, the processing circuit 120 retrieves the selected parameter look-up table from the parameter look-up tables according to the table identification number. When the pixel value is not within the value range, the processing circuit 120 retrieves a default parameter look-up table as the selected parameter look-up table. Using different dithering matrices based on different ranges that the pixel value is in allows the pixel blocks having different brightness to be dithered independently according to different amounts of the pixel value. A better dithering result can be obtained.

It is appreciated that, the value range described above may have different sizes and intervals depending on practical requirements. The present invention is not limited to a specific size or a specific interval.

In the embodiment of FIG. 5, the condition that the default parameter look-up table is the parameter look-up table PT0 is used as an example. However, in other embodiments, an independent parameter look-up table can be used as the default parameter look-up table.

In another embodiment, the processing circuit 120 may also directly retrieve the selected parameter look-up table according to the table identification number that is looked up based on the least significant bit pixel value without the determination of the pixel value and the corresponding value range.

In the practical implementation, the dithering mechanism can be performed in various embodiments. Some of the embodiments are described in the following paragraphs.

In the embodiment described above, the condition that each of the dithering matrices has the size of 2×2 is used as an example. However, in some embodiments, each of the dithering matrices may correspond to other sizes. The size is preferably $2^A \times 2^B$, wherein A and B are positive integers that do not necessarily equal to each other. Correspondingly, each of the pixel blocks categorized from the input image IN has the size of $2^A \times 2^B$. For example, each of the dithering matrices and the pixel blocks may have the size of 4×2 or 8×4. It is appreciated that under the conditions of different sizes, the amount of the dithering matrices may be different accordingly such that the amount of the matrix number that can be looked up from the parameter look-up table can be different as well.

In the embodiment described above, the condition that the number of bits of the least significant bits in each of the pixels of the input image IN to be removed is 6 and the configuration that one set of the dithering matrices is used to include all the possible least significant bit pixel values is used as an example. In some embodiments, the number of bits of the least significant bits to be removed can be any number that is a positive integer multiple of 2, such as but not limited to 4.

Further, the dithering matrices stored in the storage circuit 110 can be categorized into a plurality of matrix groups. Each of a plurality of matrix entry values included in the dithering matrices in each of the matrix groups correspond to one of the values from 0 to $2^N-1$. Each of the matrix groups includes an independent combination of the matrix entry values.

Reference is now made to FIG. 7. FIG. 7 illustrates a diagram of the dithering matrices DM00~DM15 according to an embodiment of the present invention.

In the present embodiment, the number of bits of the least significant bits in each of the pixels in the input image IN to be removed is 4 (N=4). The dithering matrices DM00~DM15 are categorized into four matrix groups MM0~MM3, each identified by the one of the matrix number s 0~3.

Each of the matrix entry values of each groups of the dithering matrices DM00~DM03, DM04~DM07, DM08~DM011 and DM12~DM15 respectively included in the matrix groups MM0~MM3 correspond to one of 0~15.

Under such a condition, besides retrieving the selected parameter look-up table from the parameter look-up tables PT0~PT3, the processing circuit 120 also retrieves a selected matrix group from the matrix groups MM0~MM3 and retrieves a selected dithering matrix from the selected matrix group.

In an embodiment, the processing circuit 120 may use the same selection mechanism that is performed on the parameter look-up tables PT0~PT3, such as but not limited to the mechanism illustrated in the flow in FIG. 5 to retrieve the selected matrix group from the matrix groups MM0~MM3. More specifically, in an embodiment, the processing circuit 120 looks up the table identification number from the pixel value look-up table according to the amount of the least significant bit pixel value and selectively determines the parameter look-up table to be retrieved according to the value range that the least significant bit pixel value is within. The detailed description of the flow can be referred to the previous paragraphs and is not described herein.

It is appreciated that the amount of the dithering matrices and the amount of the matrix groups can be determined according to an available storage amount of the storage circuit 110. For example, when the available storage amount of the storage circuit 110 is enough, even if the number of bits of the least significant bits in each of the pixels of the input image IN to be removed is 6, the storage circuit 110 may store the matrix groups each having the values that correspond to all the least significant bit pixel value (0~63) to be selected such that a more random dithering result can be obtained.

In the embodiment described above, the condition that the matrix entry values in each of the dithering matrices are different from each other is used as an example. However, in some embodiments, the matrix entry values in some of the dithering matrices can all be 0. The processing circuit 120 thus does not perform the dithering on the pending block in some circumstances.

In a specific embodiment, the pixel value look-up table AT in FIG. 6 is configured to allow different least significant bit pixel values to correspond to the same table identification number. Take such a same value as 1 as an example, no matter what the amount of the least significant bit pixel value is, the determination result of step S515 in the flow in FIG. 5 is "yes" such that the flow proceeds to step S520 to determine whether the pixel value of the pixels in the pending block is within the predetermined value range. Different dithering settings can be used according to the pixel value that is in the specific pixel value range or not in the specific pixel value ranges.

For example, when the pixel value is within the specific range (e.g., in the value range THMN1~THMX1 set by step S520), the parameter look-up table PT1 is retrieved. Under such a condition, the parameter look-up table PT1 can be configured to retrieve the dithering matrix having all the matrix entry values being zero no matter what the matrix number is looked up according to the space reference parameter and/or the time reference parameter, i.e., no dithering is performed. On the contrary, for the pixel value that is not within the specific pixel value range, other dithering matrices that can actually perform the dithering can be retrieved according to the parameter look-up table PT2. In practical implementation, since some types of the image receiving apparatus 190 may be equipped with the dithering function, the processing circuit 120 thus does not perform the dithering in some areas by using the method described above to avoid the occurrence of the interference of different dithering mechanisms between the image dithering apparatus 100 and the image receiving apparatus 190.

In the embodiment described above, the condition that the selected parameter look-up table is retrieved according to the least significant bits in the pending block is used as an example. However, in some embodiments, the processing circuit 120 may retrieve the parameter look-up table according to the time parameter and/or the color channels.

More specifically, the parameter look-up tables have an arranging order independent from each other or interlaced with each other for each of the color channels. Corresponding to each of the color channels, the processing circuit 120 retrieves the selected parameter look-up table from the parameter look-up tables according to a corresponding relation of the time parameter of the input image IN in the image stream and the arranging order.

Reference is now made to FIG. 8A, FIG. 8B and FIG. 8C. FIG. 8A, FIG. 8B and FIG. 8C illustrate diagrams of the corresponding relation between different color channels and the corresponding parameter look-up tables on the time axis according to an embodiment of the present invention.

Each of the color channels is labeled as one of the characters R, G and B that represent a red color channel, a green color channel and a blue color channel, respectively. In the parameter look-up tables corresponding to each of the color channels, notations R0~R3 are labeled to be identified as the red color channel parameter look-up tables, notations G0~G3 are labeled to be identified as the green color channel parameter look-up tables and notations B0~B3 are labeled to be identified as the blue color channel parameter look-up tables. Frame identification numbers F0~F7 are labeled to represent the order along the time axis.

As illustrated in FIG. 8A, corresponding to the red color channel, the arranging order of the parameter look-up tables is the red color channel parameter look-up tables R0~R3. Corresponding to the blue color channel, the arranging order of the parameter look-up tables is the blue color channel parameter look-up tables B0~B3. Corresponding to the green color channel, the arranging order of the parameter look-up tables is the green color channel parameter look-up tables G0~G3. The parameter look-up tables in different color channels have the arranging orders independent from each other.

For the red color channel, corresponding to the frames of the input image IN having the frame identification numbers F0~F3, the processing circuit 120 sequentially retrieves the red color channel parameter look-up tables R0~R3 as the selected parameter look-up table, respectively. For the blue color channel, corresponding to the frames of the input image IN having the frame identification numbers F0~F3, the processing circuit 120 sequentially retrieves the blue color channel parameter look-up tables B0~B3 as the selected parameter look-up table, respectively. For the green color channel, corresponding to the frames of the input image IN having the frame identification numbers F0~F3, the processing circuit 120 sequentially retrieves the green color channel parameter look-up tables G0~G3 as the selected parameter look-up table, respectively.

Since the amount of the parameter look-up tables corresponding to each of the color channels is 4, the processing circuit 120 repeats the process described above for the frames of the input image IN having the frame identification numbers F4~F7. The process can further repeat to retrieve the parameter look-up tables for every four frames of the input image.

As illustrated in FIG. 8B, among different color channels, the parameter look-up tables have an interlaced arranging order between the red color channel parameter look-up table R0, the blue color channel parameter look-up table B0 and the green color channel parameter look-up table G0.

Corresponding to the frames of the input image IN having the frame identification numbers F0~F2, the processing circuit 120 sequentially retrieves the red color channel parameter look-up table R0, the green color channel parameter look-up table G0 and the blue color channel parameter look-up table B0 for the red color channel as the selected parameter look-up tables, respectively. The processing circuit 120 sequentially retrieves the blue color channel parameter look-up table B0, the red color channel parameter look-up table R0 and the green color channel parameter look-up table G0 for the blue color channel as the selected parameter look-up tables, respectively. The processing circuit 120 sequentially retrieves the green color channel parameter look-up table G0, the blue color channel parameter look-up table B0 and the red color channel parameter look-up table R0 for the green color channel as the selected parameter look-up tables, respectively.

Since the amount of the parameter look-up tables arranged among the color channels is 3, the processing circuit 120 repeats the process described above for the frames of the input image IN having the frame identification numbers F3~F5. The process can further repeat to retrieve the parameter look-up tables for every three frames of the input image.

As illustrated in FIG. 8C, corresponding to the red color channel, the arranging order of the parameter look-up tables is sequentially the red color channel parameter look-up tables R0~R0'. Corresponding to the blue color channel, the arranging order of the parameter look-up tables is sequentially the blue color channel parameter look-up table B0~B0'. Corresponding to the green color channel, the arranging order of the parameter look-up tables is sequentially the green color channel parameter look-up table G0~G0'. The arranging order of the parameter look-up tables of each of the different color channels is independent from each other.

Such a condition is similar to that of FIG. 8A, in which only the amount of parameter look-up tables in each of the color channels is different. In the present embodiment, the red color channel parameter look-up table R0~R0' are inverse to each other (the matrix entry values of the red color channel parameter look-up table R0~R0' are inverted both horizontally and vertically). The blue color channel parameter look-up table B0~B0' are inverse to each other. The green color channel parameter look-up table G0~G0' are inverse to each other. Corresponding to different color channels, the processing circuit 120 retrieves the selected parameter look-up table according to the arranging orders described above.

Since the amount of the parameter look-up tables in each of the color channels is 2, the processing circuit 120 repeats to retrieve the parameter look-up tables for every two frames of the input image.

In some embodiments, the processing circuit 120 may operate according to different time parameters by using the methods described in FIG. 8A, FIG. 8B and FIG. 8C interchangeably or using a method in combination of at least two of the methods described in FIG. 8A, FIG. 8B and FIG. 8C. Further, in some embodiments, the processing circuit 120 may mix the parameter look-up tables corresponding to different color channels into one single group or rearrange the arranging order of the parameter look-up tables according to different time parameters.

It is appreciated that the embodiments described above are merely an example. In other embodiments, it is appreciated that various modifications and changes may be made by those of ordinary skill in the art without departing, from the spirit of the invention.

In summary, the image dithering apparatus and the image dithering method having a random dithering mechanism retrieve dithering matrices from a plurality of parameter look-up tables in a random manner according to space information and/or time information of the pending block of the image to perform dithering on a pending block such that the dithered image has a better dithering result.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image dithering method having a random dithering mechanism, comprising:
   receiving an input image having a plurality of pixels, wherein the plurality of pixels are categorized into a plurality of pixel blocks each having a size that is the same as a size of each of a plurality of dithering matrices;

setting each of the plurality of pixel blocks as a pending
block to perform steps of:
  (A) retrieving a selected parameter look-up table from
    a plurality of parameter look-up tables;
  (B) generating a space reference parameter of the
    under-calculation block in the input image and/or
    generating a time reference parameter according to a
    time parameter of the input image in an image
    stream;
  (C) looking up a matrix number from the selected
    parameter look-up table according to the space ref-
    erence parameter and/or the time reference param-
    eter;
  (D) retrieving a selected dithering matrix from the
    plurality of dithering matrices according to the
    matrix number; and
  (E) superimposing the selected dithering matrix and the
    pending block to generate a dithered block; and
  outputting a plurality of dithered blocks corresponding to
    the pixel blocks generated according to steps (A)-(E) as
    a dithered image.
2. The image dithering method of claim 1, wherein the
step of retrieving the selected parameter look-up table from
the plurality of parameter look-up tables further comprises:
  calculating a least significant bit pixel value for a plurality
    of least significant bits of each of the pixels in the
    pending block; and
  looking up a table identification number from a pixel
    value look-up table according to the least significant bit
    pixel value, so as to retrieve the selected parameter
    look-up table from the plurality of parameter look-up
    tables according to the table identification number.
3. The image dithering method of claim 2, further com-
prising:
  determining whether a pixel value of the plurality of
    pixels in the pending block is within a value range that
    the table identification number corresponds to;
  when the pixel value is within the value range, retrieving
    the selected parameter look-up table from the plurality
    of parameter look-up tables according to the table
    identification number; and
  when the pixel value is not within the value range,
    retrieving a default parameter look-up table from the
    plurality of parameter look-up tables as the selected
    parameter look-up table.
4. The image dithering method of claim 2, wherein a
plurality of matrix entry values comprised in a part of the
dithering matrices in the plurality of dithering matrices are
all 0.
5. The image dithering method of claim 2, wherein a
number of bits of the plurality of least significant bits is N,
each of a plurality of matrix entry values comprised in the
plurality of dithering matrices correspond to one of values
from 0 to $2^N-1$.
6. The image dithering method of claim 2, wherein a
number of bits of the plurality of least significant bits is N,
the plurality of dithering matrices are categorized into a
plurality of matrix groups, each of a plurality of matrix entry
values comprised in the plurality of dithering matrices in
each of the plurality of matrix groups correspond to one of
values from 0 to $2^N-1$, and each of the plurality of matrix
groups comprises an independent combination of the plu-
rality of matrix entry values, the image dithering method
further comprising:
  looking up a matrix group identification number and a
    matrix number from the selected parameter look-up table according to the space reference parameter and/or
the time reference parameter; and
retrieving a selected matrix groups from the plurality of
  matrix groups according to the matrix group identifi-
  cation number, and retrieving the selected dithering
  matrix from the plurality of dithering matrices of the
  selected matrix groups according to the matrix number.
7. The image dithering method of claim 1, wherein each
of the plurality of parameter look-up tables comprises a
space parameter look-up table and/or a time parameter
look-up table, the image dithering method further compris-
ing:
  looking up a first parameter from the space parameter
    look-up table according to the space reference param-
    eter and/or looking up a second parameter from the
    time parameter look-up table according to the time
    reference parameter; and
  according to an amount of the plurality of dithering
    matrices, performing a modulo operation on one of the
    first parameter and the second parameter or on a sum of
    the first parameter and the second parameter to obtain
    a remainder, so as to generate the matrix number
    according to the remainder.
8. The image dithering method of claim 1, wherein the
plurality of pixels comprise a plurality of color channels, the
plurality of parameter look-up tables correspond to different
one of the plurality of color channels such that the plurality
of pixels comprised by the pending block in the different
color channels are superimposed with the corresponding
dithering matrices to generate the dithered block.
9. The image dithering method of claim 8, wherein the
plurality of parameter look-up tables have an arranging
order independent from each other or interlaced with each
other in each of the plurality of color channels, the image
dithering method further comprising:
  corresponding to each of the plurality of color channels,
    retrieving the selected parameter look-up table from the
    plurality of parameter look-up tables according to a
    corresponding relation of the time parameter of the
    input image in the image stream and the arranging
    order; and
  looking up the matrix number from the selected parameter
    look-up table according to the space reference param-
    eter, to further retrieve the selected dithering matrix
    from the plurality of dithering matrices according to the
    matrix number.
10. The image dithering method of claim 1, wherein the
dithered image is received by an image receiving apparatus
such that the image receiving apparatus removes the plural-
ity of least significant bits of the plurality of pixels in the
dithered image and perform processing subsequently.
11. An image dithering apparatus having a random dith-
ering mechanism comprising:
  a storage circuit configured to store a plurality of param-
    eter look-up tables and a plurality of dithering matrices;
    and
  a processing circuit electrically coupled to the storage
    circuit to access the storage circuit, and configured to
    execute an image dithering method comprising:
    receiving an input image having a plurality of pixels,
      wherein the plurality of pixels are categorized into a
      plurality of pixel blocks each having a size that is the
      same as a size of each of the plurality of dithering
      matrices;
    setting each of the plurality of pixel blocks as a pending
      block to perform steps of:

(A) retrieving a selected parameter look-up table from the plurality of parameter look-up tables;

(B) generating a space reference parameter of the under-calculation block in the input image and/or generating a time reference parameter according to a time parameter of the input image in an image stream;

(C) looking up a matrix number from the selected parameter look-up table according to the space reference parameter and/or the time reference parameter;

(D) retrieving a selected dithering matrix from the plurality of dithering matrices according to the matrix number; and (E) superimposing the selected dithering matrix and the pending block to generate a dithered block; and outputting a plurality of dithered blocks corresponding to the pixel blocks generated according to steps (A)-(E) as a dithered image.

12. The image dithering apparatus of claim 11, wherein the step of retrieving the selected parameter look-up table from the plurality of parameter look-up tables further comprises:

calculating a least significant bit pixel value for a plurality of least significant bits of each of the pixels in the pending block; and looking up a table identification number from a pixel value look-up table according to the least significant bit pixel value, so as to retrieve the selected parameter look-up table from the plurality of parameter look-up tables according to the table identification number.

13. The image dithering apparatus of claim 12, wherein the image dithering method further comprises:

determining whether a pixel value of the plurality of pixels in the pending block is within a value range that the table identification number corresponds to;

when the pixel value is within the value range, retrieving the selected parameter look-up table from the plurality of parameter look-up tables according to the table identification number; and when the pixel value is not within the value range, retrieving a default parameter look-up table from the plurality of parameter look-up tables as the selected parameter look-up table.

14. The image dithering apparatus of claim 12, wherein a plurality of matrix entry values comprised in a part of the dithering matrices in the plurality of dithering matrices are all 0.

15. The image dithering apparatus of claim 12, wherein a number of bits of the plurality of least significant bits is N, each of a plurality of matrix entry values comprised by the plurality of dithering matrices correspond to one of values from 0 to $2^N-1$.

16. The image dithering apparatus of claim 12, wherein a number of bits of the plurality of least significant bits is N, the plurality of dithering matrices are categorized into a plurality of matrix groups, each of a plurality of matrix entry values comprised by the plurality of dithering matrices in each of the plurality of matrix groups correspond to one of values from 0 to $2^N-1$, and each of the plurality of matrix groups comprises an independent combination of the plurality of matrix entry values, the image dithering method further comprising:

looking up a matrix group identification number and a matrix number from the selected parameter look-up table according to the space reference parameter and/or the time reference parameter; and retrieving a selected matrix groups from the plurality of matrix groups according to the matrix group identification number, and retrieving the selected dithering matrix from the plurality of dithering matrices of the selected matrix groups according to the matrix number.

17. The image dithering apparatus of claim 11, wherein each of the plurality of parameter look-up tables comprises a space parameter look-up table and/or a time parameter look-up table, the image dithering method further comprising:

looking up a first parameter from the space parameter look-up table according to the space reference parameter and/or looking up a second parameter from the time parameter look-up table according to the time reference parameter; and according to an amount of the plurality of dithering matrices, performing a modulo operation on one of the first parameter and the second parameter or on a sum of the first parameter and the second parameter to obtain a remainder, so as to generate the matrix number according to the remainder.

18. The image dithering apparatus of claim 11, wherein the plurality of pixels comprise a plurality of color channels, the plurality of parameter look-up tables correspond to different one of the plurality of color channels such that the plurality of pixels comprised by the pending block in the different color channels are superimposed with the corresponding dithering matrices to generate the dithered block.

19. The image dithering apparatus of claim 18, wherein the plurality of parameter look-up tables have an arranging order independent from each other or interlaced with each other in each of the plurality of color channels, the image dithering method further comprising:

corresponding to each of the plurality of color channels, retrieving the selected parameter look-up table from the plurality of parameter look-up tables according to a corresponding relation of the time parameter of the input image in the image stream and the arranging order; and looking up the matrix number from the selected parameter look-up table according to the space reference parameter, to further retrieve the selected dithering matrix from the plurality of dithering matrices according to the matrix number.

20. The image dithering apparatus of claim 11, wherein the dithered image is received by an image receiving apparatus such that the image receiving apparatus removes the plurality of least significant bits of the plurality of pixels in the dithered image and perform processing subsequently.

* * * * *